United States Patent Office 3,235,422
Patented Feb. 15, 1966

3,235,422
FLUOROCARBON PROPELLANT
Peter L. Stang, San Jose, Calif., assignor to United Aircraft Corporation, East Hartford, Conn., a corporation of Delaware
No Drawing. Filed Mar. 22, 1963, Ser. No. 267,328
4 Claims. (Cl. 149—19)

This invention relates to a fluorocarbon propellant-binder and more particularly relates to a high density, castable fluorocarbon propellant-binder adapted for use in forming a solid propellant rocket grain in combination with an energetic fuel and/or oxidizer additive.

In the past, various binders, including fluorocarbon binders, have been proposed, but in general these have suffered from several defects. For one thing, the fluorocarbon propellant-binders heretofore known have an insufficiently high density unless they are cast under pressure. Since such binders are frequently used in large sections, the cost of compression molding such binders may be on the order of hundreds of thousands of dollars. Further, in particular for hybrid rocket fuel applications, the binder must not char under conditions of use. Other desirable properties are that the binder be one which can be mixed at normal ambient temperatures and cured under normal temperatures or only slightly elevated temperatures. Under some conditions, it is desirable that the density of the binder be variable over a fairly wide range, but the binders heretofore known are not subject to variation depending on the mission for which they are destined. A further desirable attribute of the propellant-binder is that it has good compatibility with burning rate catalysts and particularly with solid oxidants which are frequently employed in solid propellants.

The novel fluorocarbon binders of the present invention possess all of the above desirable attributes. High density propellant-binders are highly desirable because they greatly increase the capability of the rocket in which they are used. This is particularly important in the case of volume-limited missiles which have been designed for use with conventional propellant-binders. Conventional propellant-binders have specific gravities of around 1, some systems having specific gravities as low as 0.9 while other systems having specific gravities slightly over 1 are quite common. In the case of a volume-limited system such as those installed in submarines or silos, the system cannot be given increased capability merely by making the rockets larger because they must fit into an existing structure. Thus, a way of increasing the capabilities of such a system without utilizing extremely hazardous materials is to provide a propellant-binder of greater density. Since the specific gravity of many of the propellant-binders made in accordance with the present invention approaches 1.9, it is apparent that an extremely large increase in capability is possible in a volume-limited system which has been designed for specific gravities on the order of 1.

In accordance with the present invention, a castable, high density propellant-binder is made from at least three components, namely, a polymerizable fluorocarbon ester, a halocarbon plasticizer and a free radical curing agent.

The fluorocarbon ester monomer is selected from fluoroalkyl acrylates and fluoroalkyl methacrylates which have the following general formula:

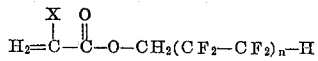

In the above, X is hydrogen or a methyl radical and $n$ is an integer of from 1 to 4. Thus, the alcohol chain has an odd number of carbon atoms, the number being between 3 and 9. Of these compounds, the $C_9$ compounds are preferred since they generally give binders of the highest density.

Various halocarbon plasticizers can be used providing the plasticizer has a completely halogenated carbon chain which is free of reactive groups such as hydroxyl or carbonyl radicals. Particularly suitable plasticizers are sold under the trade name of Kel-F, with various grade designations such as No. 1, No. 2, No. 3, No. 40 and No. 90. These are all relatively low molecular weight polymers of chlorotrifluoroethylene and the numbers in each instance indicate the viscosity in centistokes at 210° F. Another suitable plasticizer is sold under the trade name Viton LD–227. This is a copolymer of hexachloropropylene and vinylidene fluoride.

Various free radical curing agents are well known to those skilled in the art and typical suitable agents include azobisisobutyronitrile and the various organic peroxides which are sold as curing agents, such as benzoyl peroxide. Of these, azobisisobutyronitrile is preferred because of its high efficiency and its compatibility with energetic propellant additives.

Various oxidizers can be used with the propellant-binders of the present invention. The compositions are stable in the presence of conventional oxidizers such as ammonium perchlorate and with other substances such as finely divided metals. Although binders are not oxidizers in the usual sense of the word, the fluorocarbon binder of the present invention enters into an exothermic reaction with the finely divided metals and are thus considered oxidizers. This particular combination produces excellent pyrotechnic materials abnormally high in infrared radiation. Further, the propellant-binder may be employed as the solid component of a hybrid rocket wherein the fuel is a fluid such as liquid hydrazine. In addition, the propellant-binder with high solids loading of finely divided metals may also be employed as the solid component of a hybrid rocket propellant system wherein the principal oxidizer is a fluid such as nitrogen tetraoxide.

The following non-limiting examples represent preferred embodiments of the invention.

*Example 1*

A quantity of 79.6 grams of a $C_9$ fluoroalkyl methacrylate was washed with a 5% NaOH solution and distilled water and then dried over anhydrous magnesium sulfate and filtered. The filtered material was placed in a flask together with 0.4 gram of azobisisobutyronitrile and 20 grams of Kel–F No. 3 oil. The materials were mixed at 25° C. for 10 minutes and the binder was immediately ready for use. The material was cured under argon to prevent oxygen cure inhibition at a temperature of 50° C. for six hours. The material formed a dense, fully compatible binder with a sp. gr. of about 1.82.

In the following examples, substantially the same process as in Example 1 was employed. In some of the examples, only the propellant-binder portion of the rocket grain was prepared. With such compositions a solid oxidizer or fuel such as finely divided metal could be incorporated or the composition could be used as such in a hybrid rocket.

| Example | Monomer, Percent by Wt. | Halocarbon Plasticizer, Percent by Wt. | Curing Agent, Percent by Wt. | Cure Temp. (°C.) | Cure Time (Hours) | Solids Loading, Percent by Wt. | Temperature °C. | Mix Time, Min. | Density, g./cc. |
|---|---|---|---|---|---|---|---|---|---|
| 2 | 23.88 C$_9$ FAM | 6.0 Kel-F No. 3 | 0.12 AIBN | 50 | 8 | 20% Al, 50% (NH$_4$)$_2$SO$_4$. | 46 | 30 | |
| 3 | 26.12 C$_9$ FAM | 8.75 Kel-F No. 3 | 0.13 AIBN | 50 | 8 | 65% Mg* | 25 | 30 | |
| 4 | 79.6 C$_7$ FAM | 20.0 Kel-F No. 3 | 0.4 AIBN | 50 | 8 | | 25 | 10 | 1.75 |
| 5 | 79.6 C$_9$ FAM | 20.0 Viton LD-227 | 0.4 AIBN | 50 | 8 | | 25 | 10 | 1.80 |
| 6 | 79.6 C$_9$ FAM | 20.0 Kel-F No. 90 | 0.4 AIBN | 50 | 8 | | 25 | 10 | 1.82 |
| 7 | 69.65 C$_9$ FAM | 30.0 Kel-F No. 3 | 0.35 AIBN | 50 | 8 | | 25 | 10 | 1.86 |
| 8 | 79.99 C$_9$ FAM | 20.0 Kel-F No. 3 | 0.01 AIBN | 50 | 16 | | 25 | 10 | 1.82 |
| 9 | 79.2 C$_9$ FAM | 20.0 Kel-F No. 3 | 0.8 Benzoyl Peroxide | 60 | 12 | | 25 | 10 | 1.82 |
| 10 | 79.92 C$_9$ FAM | 20.0 Kel-F No. 3 | 0.08 Benzoyl Peroxide | 60 | 16 | | 25 | 10 | 1.82 |
| 11 | 79.6 C$_5$ FAM | 20.0 Kel-F No. 3 | 0.4 AIBN | 50 | 8 | | 25 | 10 | 1.70 |
| 12 | 79.6 C$_3$ FAM | 20.0 Kel-F No. 3 | 0.4 AIBN | 50 | 8 | | 25 | 10 | 1.56 |
| 13 | 79.6 C$_9$ FAA | 20.0 Kel-F No. 3 | 0.4 AIBN | 50 | 8 | | 25 | 10 | 1.86 |
| 14 | 26.12 C$_9$ FAM | 8.75 Kel-F No. 3 | 0.13 AIBN | 50 | 8 | 65% Ammonium Perchlorate. | 25 | 10 | |

FAM=fluoroalkyl methacrylate.
FAA=fluoroalkyl acrylate.
AIBN=azobisisobutyronitrile.
Mg*=32.5%−100+200 mesh Mg metal; 32.5%−375 mesh Mg metal.

I claim:
1. A high density propellant comprising a solid inorganic oxidizer and a binder consisting essentially of a polymerized fluorocarbon monomer having the formula

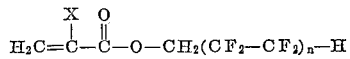

wherein X is a constituent selected from the group consisting of hydrogen and methyl and $n$ is an integer from 1 to 4, a halocarbon plasticizer consisting of a substantially complete halogenated carbon chain which is free from reactive groups such as hydroxyl and carbonyl radicals and a free radical curing agent.

2. A high density propellant binder as in claim 1 wherein the free radical curing agent is azobisisobutyronitrile.

3. A high density propellant binder as in claim 1 wherein the monomer is a 1H,1H,9H-hexadecafluorononyl methacrylate.

4. A high density propellant binder consisting essentially of a polymerized fluorocarbon monomer selected from the group consisting of fluoroalkyl acrylates and fluoroalkyl methacrylates wherein the quantity of carbon atoms in the fluorine-containing side chain thereof is an odd number from 3 to 9, a hydrocarbon plasticizer consisting of a substantially completely halogenated carbon chain which is free of reactive groups such as hydroxyl and carbonyl radicals and a free radical curing agent.

References Cited by the Examiner

UNITED STATES PATENTS

| 2,968,145 | 1/1961 | Kanarek | 60—35 |
| 3,003,310 | 10/1961 | D'Alelio | 149—83 XR |
| 3,010,815 | 11/1961 | Pierce et al. | 149—22 |
| 3,067,074 | 12/1962 | Gey | 149—19 |
| 3,027,283 | 3/1963 | Bice | 149—19 |
| 3,108,432 | 10/1963 | Balaceanu et al. | 149—19 XR |
| 3,109,761 | 11/1963 | Cobb et al. | 149—19 |

OTHER REFERENCES

Faber: Astronautics, volume 5, No. 8, August 1960, pages 34, 40 and 42.

CARL D. QUARFORTH, *Primary Examiner*.